March 8, 1927. 1,620,096

F. W. HARRIS

GAS AND OIL SEPARATOR

Filed April 23, 1925

INVENTOR:
Fred W. Harris

Patented Mar. 8, 1927.

1,620,096

UNITED STATES PATENT OFFICE.

FORD W. HARRIS, OF LOS ANGELES, CALIFORNIA.

GAS AND OIL SEPARATOR.

Application filed April 23, 1925. Serial No. 25,454.

My invention relates to gas and oil separators such as are used in connection with oil wells to separate the gas from the oil as the mixture thereof leaves the well.

In the production of petroleum oils the oil either flows or is pumped from the well, and as it emerges from the well into the flow pipe the oil usually contains a greater or smaller proportion of gas entrained therein. It is highly necessary to separate this gas from the oil, and this can be done as conveniently at the well as thereafter. It will then be unnecessary to keep the oil in gas tight containers to conserve the gas. It is an object of my invention to provide an inexpensive and simple form of gas and oil separator which may be placed at the well and which will operate to efficiently separate the gas and oil, delivering them to separate pipes for storage or other utilization.

It is common practice in the art to provide such separators in which the oil and gas are separated and in which a definite level of oil is maintained by means of floats which control a valve in the oil outlet pipe. It is a further object of my invention to provide a gas and oil separator in which a definite minimum level of oil is maintained without the use of floats in the separating chamber.

It is a further object of my invention to provide a gas and oil separator which is suited to work under a wide variety of conditions as to terminal pressure in the oil and gas pipes into which the separator discharges.

It is a further object of my invention to provide a separator in which the separating chamber, and in fact the greater portion of the separator, is made up of standard pipe fittings.

Further objects and advantages will be made evident hereinafter.

Referring to the drawing which is for illustrative purposes only,

Figure 2:
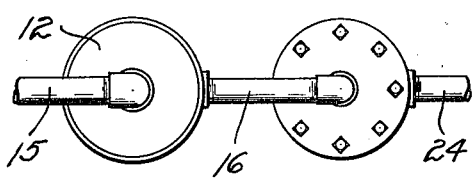
Fig. 2 is a plan view thereof.
Figure 3:
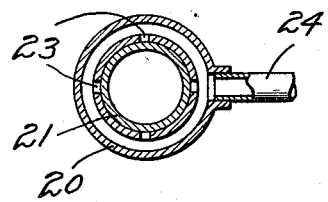
Fig. 3 is a section taken on the line 3—3 of Fig. 1.

In the form of the invention shown I provide a separating chamber 11 which is preferably formed of one or more lengths of pipe or casing 12 and 13 which may be joined at the junction point by collars 14. Oil from the well is discharged into the top of the chamber 11 through a flow pipe 15, this pipe preferably projecting down into the chamber 11 so as to deliver oil into this chamber at a point somewhat below the top thereof. Leading from the top of the chamber 11 is a gas pipe 16, and from the bottom thereof is an oil pipe 17. The pipe 16 is in open communication with a primary chamber 18 in the top of a casing 20, and the pipe 17 is in open communication with a secondary chamber 19 in the bottom of this casing, the secondary chamber being separated from the primary chamber by a septum or piston 21 which is free to slide vertically in a cylindrical bore or control chamber in the casing 20.

Formed in the wall of the bore in the casing 20 is a plurality of gas ports 23, these ports all communicating with a gas delivery pipe 24. Also formed in the walls of the bore of the casing 20 is a plurality of oil ports 25, all of which are in communication with an oil delivery pipe 26.

Figure 1:
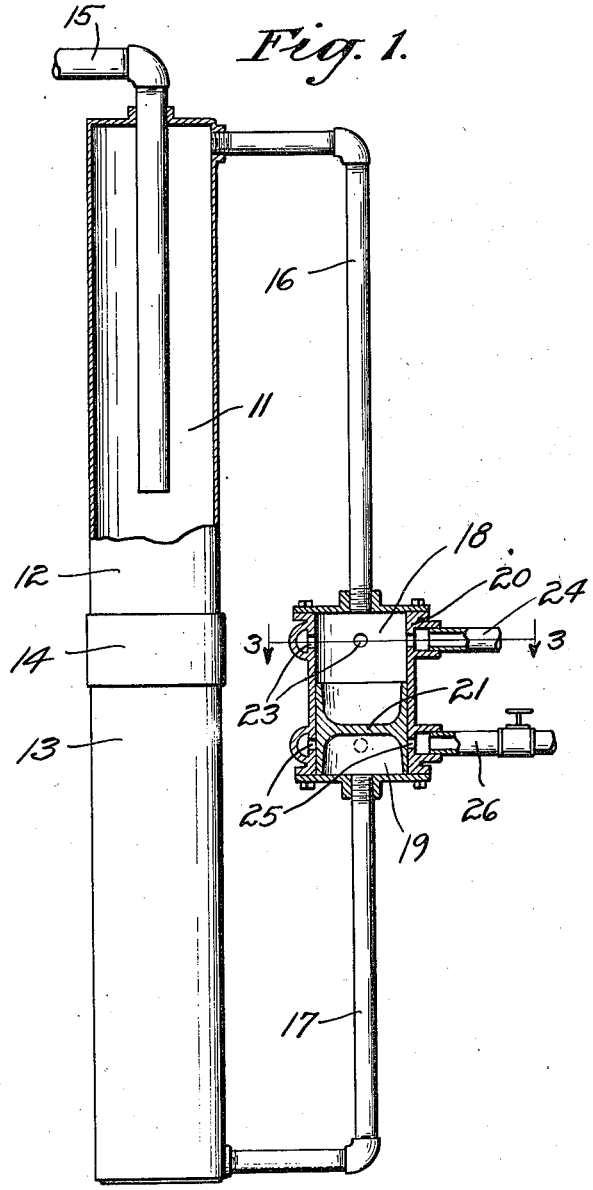
Fig. 1 is a side elevation partly in section showing one embodiment of my invention.
Figure 6:
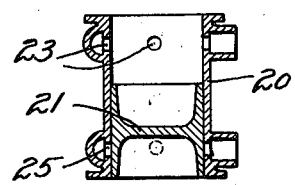

The method of operation of the invention is as follows:

The parts being in the position shown in Fig. 1 with the piston 21 resting on account of its weight at the bottom of the bore in which it slides as shown in Fig. 6, a mixture of oil and gas is admitted from the well through the flow pipe 15 into the chamber 11, the oil settling to the bottom and the gas rising to the top. The gas then flows through the pipe 16 into the top of the casing 20 and through the gas ports 23 into the gas outlet pipe 24. This pipe may be under some pressure above atmospheric, or under a slight vacuum. Quite regardless of whether the gas flows freely through the pipe 24 or is constricted or flows against pressure, the piston 21 rests in its lower position.

Figure 5:
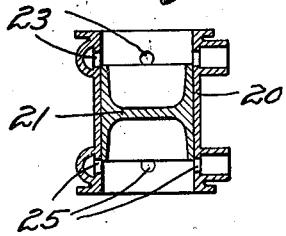

The piston being in its lower position, as shown in Fig. 6, shuts off the ports 25 and hence no oil can flow through the pipe 26. As the level of the oil rises in the chamber 11, it tends to exert pressure on the bottom of the piston 21. This pressure will not be at all effective however until the level of the oil in the chamber 11 rises above the level at which the piston is placed. As the level of the oil rises above this point, however, there is an unbalancing of pressure on the piston, the pressure on the top being the gas pressure and the pressure on the bottom being composed of the gas pressure plus the static pressure of the head of oil above the level of the piston. As soon, therefore, as the pressure of the unbalanced head of oil is sufficient to lift the piston, it starts to rise from the position shown in Fig. 6, and as more oil is run into the chamber 11 it tends to lift the piston 21 until this piston reaches the position shown in Fig. 5, in which the oil ports 25 are partly uncovered. At this point oil starts to flow through these ports into the pipe 26. The piston 21 will continue to rise until the ports are fully uncovered, unless the flow of oil outwardly from the secondary chamber 19, through the ports 25, becomes equal to the flow of oil therein. If such a condition of balance occurs, the piston will stop its upward movement and both oil and gas will discharge until some difference in the rate of flow of the oil will cause the piston to move up or down. If for any reason the ports 25 are fully uncovered and the increase in the level of oil in the chamber 11 is not checked, which may occur if there is considerable friction in the pipe 26, or if that pipe delivers oil against some head as when pumping into a tank, then the piston will continue to rise after the ports 25 are uncovered and will gradually close the ports 23. This will first throttle the gas flow and tend to increase the gas pressure, and if it goes on for some time will entirely shut off the flow of gas, closing the ports 23 entirely so that no gas can leave the chamber 11. In either event any increase in gas pressure in the chamber 11 is available to force oil outwardly from the chamber 11 and through the ports 25, into the pipe 26, and when the gas ports 23 are entirely shut off the gas pressure will increase to the maximum pressure that the well will produce, if this is necessary to make the oil flow through the pipe 26. If for example there is a closed valve in the pipe 26, the piston will lift and close the ports 23 and the trap will build up pressure until it checks the flow of oil through the flow pipe 15, into the separator. If however the entire pressure of the well is not needed to cause oil to flow through the pipe 26 but some pressure is needed, the piston 21 will partly close the ports 23 to such a degree as to maintain the necessary pressure in the top of the chamber 11 to cause such a flow.

Whenever the flow of oil continues to such a point that the level of the oil in the chamber 11 reaches the same level as the piston 21, the pressure on the top of the piston will be equal to the pressure on the bottom, the head of oil in the pipe 17 balancing the head of oil in the bottom of the chamber 11 and the gas pressure being effective on each side of the piston. It is obvious that this condition of balance will occur quite regardless of any condition in the pipes 24 and 26. With this condition of balance, the weight of the piston 21 tends to cause the piston to move downwardly. Owing to sand which may be present in the oil and which might cause the piston to stick, it is highly desirable that the piston be positively actuated and that force in addition to its weight be exerted to force the piston downwardly. The piston may therefore be made light, which saves cost; and its weight may be so small that it will not of itself overcome the probable friction if we apply a positive force to move the piston.

Figure 4:
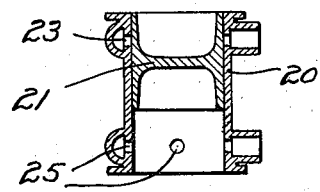
Figs. 4, 5 and 6 are diagrams showing different positions of the piston of my valve means.

For the purpose of providing such a positive force I place the piston in about the position shown, which may be a little below the middle of the chamber 11. If the piston is in the position shown in Fig. 4, or in the position shown in Fig. 5, with the level of the oil in the chamber 11 at about the level of the piston 21, the weight of the piston tends to cause the piston to fall and close the ports 25. If for any reason the piston does not fall and the level of the oil in the chamber 11 is further reduced by oil flowing out through the pipe 26 in excess of the amount supplied through the pipe 15, then there occurs an unbalancing of pressures on the piston 21, the pressure on the top increasing and the pressure on the bottom diminishing as the level of the oil in the chamber 11 falls. The pressure on the bottom of the piston is always equal to the head of oil in the chamber 11, less the head of oil in the pipe 17, plus the gas pressure; the pressure on the top of the piston is always equal to the gas pressure. If then the head of oil in the chamber 11 is less than the head of oil in the pipe 17, this extra head must be made up by an increase of gas pressure and the difference in the two heads is available to force the piston downwardly. If we neglect the weight of the piston we can then see that any increase in head of the oil in the chamber 11 above the level at which the chamber 11 is placed is available to lift the piston 21 is placed is available to lift the piston, and any decrease is available to force the piston downwardly.

In practice it is possible to operate using a single joint of pipe 20 feet long for the chamber 11. The piston 21 is then located as shown slightly below the middle of the pipe and we can figure on about an 8 foot rise of oil to lift the piston and about the same amount to force it downwardly. This will give a maximum pressure of something over three pounds per square inch to operate the piston in either direction. If a piston 4 inches in diameter is used, it will have an area of about 12½ square inches, and we will have an available force of nearly 40 pounds forcing the piston either up or down as necessity warrants. Obviously, by making the piston larger the amount of available force will increase as the square of the diameter so that an 8 inch piston will have an available operating force of 160 pounds.

I claim as my invention:

1. In an oil and gas separator, the combination of: walls forming a separating chamber; means for introducing an oil and gas mixture into said separating chamber; walls forming a control piston chamber; a gas conduit connecting the upper portion of said separating chamber with the upper end of said piston chamber; an oil conduit connecting the lower portion of said separating chamber with the lower end of said piston chamber, a gas delivery port opening from the upper end of the bearing surface of said piston chamber, and an oil delivery port opening from the lower end of the bearing surface of said piston chamber; and a piston slidably disposed in said piston chamber and adapted in its up position to close said gas delivery port and in its down position to close said oil delivery port.

2. In an oil and gas separator, the combination of: walls forming a separating chamber; means for introducing an oil and gas mixture into said separating chamber; walls forming a control piston chamber; a gas conduit connecting the upper portion of said separating chamber with the upper end of said piston chamber; an oil conduit connecting the lower portion of said separating chamber with the lower end of said piston chamber; a gas delivery port opening from the upper end of the bearing surface of said piston chamber, and an oil delivery port opening from the lower end of the bearing surface of said piston chamber; and a piston slidably disposed in said piston chamber and adapted in its up position to close said gas delivery port and in its down position to close said oil delivery port said piston opening each of said ports while the other one is closed.

3. In an oil and gas separator, the combination of: walls forming a separating chamber; means for introducing an oil and gas mixture into said separating chamber; walls forming a control piston chamber; a gas conduit connecting the upper portion of said separating chamber with the upper end of said piston chamber; an oil conduit connecting the lower portion of said separating chamber with the lower end of said piston chamber, a gas delivery port opening from the upper end of the bearing surface of said piston chamber, and an oil delivery port opening from the lower end of the bearing surface of said piston chamber; and a piston slidably disposed in said piston chamber and responsive to an increase in level of liquid in said separating chamber to move upward and close said gas delivery port and responsive to a decrease in level of liquid in said separating chamber to move downward and close said oil delivery port.

4. In an oil and gas separator, the combination of: walls forming a separating chamber; means for introducing an oil and gas mixture into said separating chamber; walls forming a control piston chamber; a gas conduit connecting the upper portion of said separating chamber with the upper end of said piston chamber; an oil conduit connecting the lower portion of said separating chamber with the lower end of said piston chamber, a gas delivery port opening from the upper end of the bearing surface of said piston chamber, and an oil delivery port opening from the lower end of the bearing surface of said piston chamber; and a piston slidably disposed in said piston chamber and responsive to an increase in level of liquid in said separating chamber to move upward and close said gas delivery port and responsive to a decrease in level of liquid in said separating chamber to move downward and close said oil delivery port said piston opening each of said ports while the other one is closed.

5. In an oil and gas separator, the combination of: walls forming a separating chamber, means for introducing an oil and gas mixture into said separating chamber; walls forming a control chamber having a piston bore from the upper and lower ends of which gas and oil delivery ports are formed, respectively; a piston slidably fitting within said bore so as to substantially seal the upper end of said control chamber from the lower end thereof; means for connecting the upper ends of said chambers together and the lower ends of said chambers together so that the static expansive fluid pressure within said separating chamber will be equally communicated to the upper and lower faces of said piston and so that the hydraulic pressure of liquid disposed in said separating chamber above the level of said piston will be transmitted to the bottom of said piston, said hydraulic pressure, at a certain value, causing said piston to rise in said bore, shut said gas delivery port, and open said oil delivery port, a reverse action of said piston occurring upon completion of the discharge of a quantity of oil through said oil delivery port.

6. An oil and gas separator comprising: walls forming a separating space; walls forming a control space; a slidable fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a discharge pipe leading from said primary chamber; and means by which said member can prevent the flow of fluid through said discharge pipe.

7. An oil and gas separator comprising: walls forming a separating space; walls forming a control space; a fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a primary discharge pipe leading from said primary chamber; a secondary discharge pipe leading from said secondary chamber; and means by which said member can prevent the flow of fluid through either one of said pipes.

8. An oil and gas separator comprising: walls forming a separating space; walls forming a control space; a fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a primary discharge pipe leading from said primary chamber; a secondary discharge pipe leading from said secondary chamber; primary valve means actuated by said member and adapted to prevent the flow of fluid through said primary discharge pipe; and secondary valve means actuated by said member and adapted to prevent the flow of fluid through said secondary discharge pipe.

9. An oil and gas separator comprising: walls forming a separating space; walls forming a control space; a fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a primary discharge pipe leading from said primary chamber; a secondary discharge pipe leading from said secondary chamber; primary valve means actuated by said member and adapted to prevent the flow of fluid through said primary discharge pipe; and secondary valve means actuated by said member and adapted to prevent the flow of fluid through said secondary discharge pipe, said primary valve means being actuated at one position of said member and said secondary valve means being actuated at another position of said member.

10. An oil and gas separator comprising: walls forming a separating space; walls forming a control space; a fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a primary discharge pipe leading from said primary chamber; a secondary discharge pipe leading from said secondary chamber; and means associated with said member so that when liquid is admitted into said separating space to a certain level said member will be moved to prevent a flow of fluid through one of said pipes and permit a flow of fluid through the other of said pipes.

11. An oil and gas separator comprising: walls forming a separating space; walls forming a control space; a fluid pressure responsive member in said control space on a horizontal plane passing through the lower portion of said separating space, said member dividing said control space into a primary chamber, in communication with the upper portion of said separating space, and a secondary chamber, in communication with the lower portion of said separating space; a primary discharge pipe leading from said primary chamber; a secondary discharge pipe leading from said secondary chamber; and means associated with said member so that when liquid is admitted into said separating space to a certain level said member will be moved to prevent a flow of fluid through one of said pipes and permit a flow of fluid through the other of said pipes and so that upon the drawing of said liquid from said separating space to a certain lower level, the control of said pipes by said member will be reversed.

In testimony whereof, I have hereunto set my hand at Los Angeles, California, this 18th day of April, 1925.

FORD W. HARRIS.